Feb. 16, 1932. J. MITZL 1,845,551

MOTOR SUPPORTING ARRANGEMENT

Filed April 29, 1931 3 Sheets-Sheet 1

INVENTOR.
Josef Mitzl.
BY
ATTORNEY.

Feb. 16, 1932.  J. MITZL  1,845,551
MOTOR SUPPORTING ARRANGEMENT
Filed April 29, 1931   3 Sheets-Sheet 2

INVENTOR.
Josef Mitzl.
BY
Grant Baldwin
ATTORNEY.

Feb. 16, 1932. J. MITZL 1,845,551
MOTOR SUPPORTING ARRANGEMENT
Filed April 29, 1931 3 Sheets-Sheet 3

INVENTOR.
Josef Mitzl.
BY
ATTORNEY.

Patented Feb. 16, 1932

1,845,551

UNITED STATES PATENT OFFICE

JOSEF MITZL, OF MELVINDALE, MICHIGAN

MOTOR SUPPORTING ARRANGEMENT

Application filed April 29, 1931. Serial No. 533,750.

This invention relates to improvements in motor supporting arrangements. When motors are employed either in connection with musical instruments or for certain other uses it is very desirable to eliminate noise and vibration ordinarily transmitted through the frame to the base on which it rests. My invention aims to provide a motor supporting arrangement whereby the motor is rendered practically noiseless, and wherein practically no vibration is transmitted from the moving parts to the base or flooring on which the motor rests.

Other objects and advantages will become apparent as the specification proceeds wherein my invention is shown in connection with an electric motor though it is, of course, understood that it may be applied to any type of motor wherein a shaft is rotated in a stationary portion through which vibration may be transmitted, or wherein the rotation of the shaft may cause noise that is ordinarily transmitted through the base on which the stationary portion is mounted.

Figure 1:
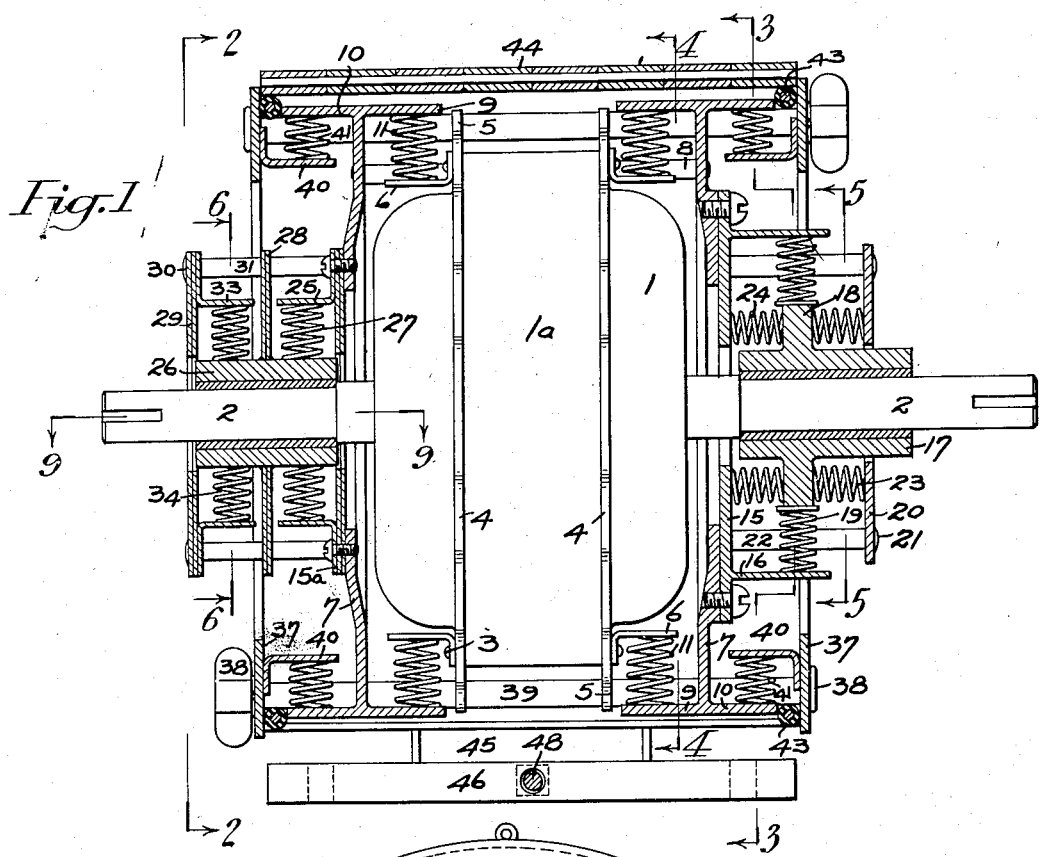
Figure 1 illustrates a cross section of the invention employed for supporting an electric motor.

Figures 3, 4, 5 and 6 are sections on the lines 3—3, 4—4, 5—5 and 6—6 of Figure 1.

Figure 3:
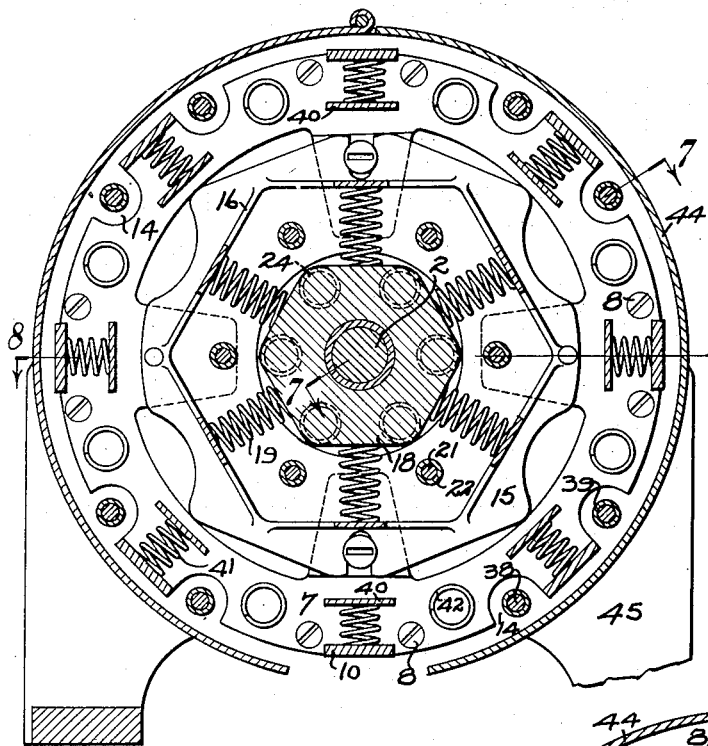
Figure 6:
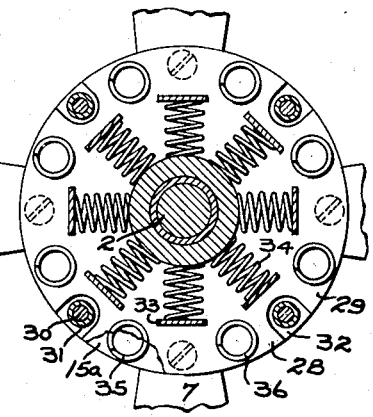
Figure 5:
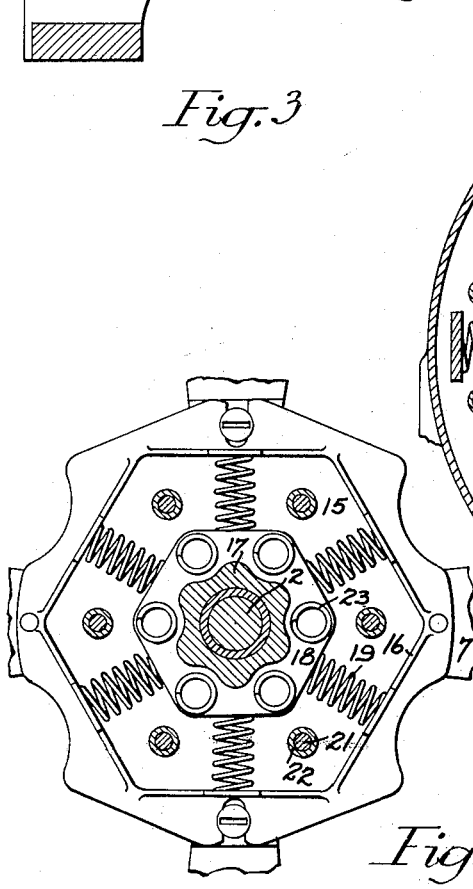
Figure 4:
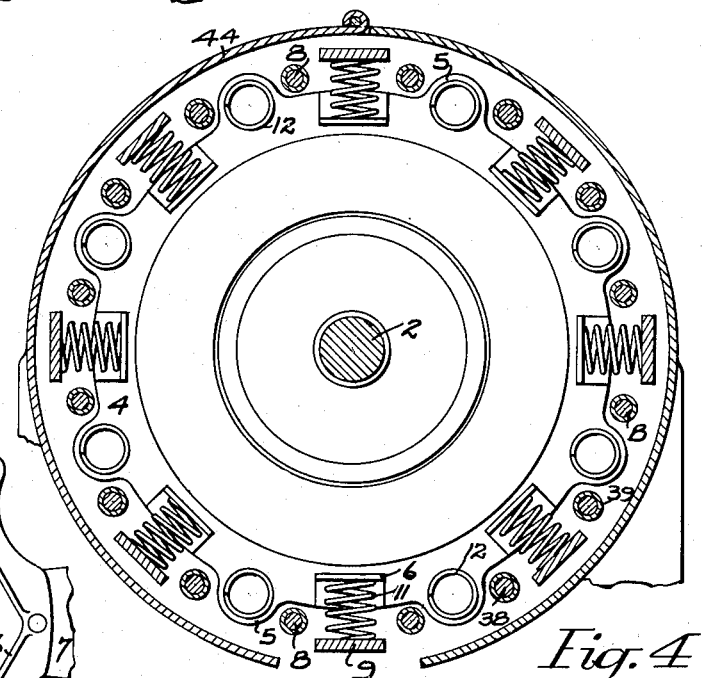
Figure 8:
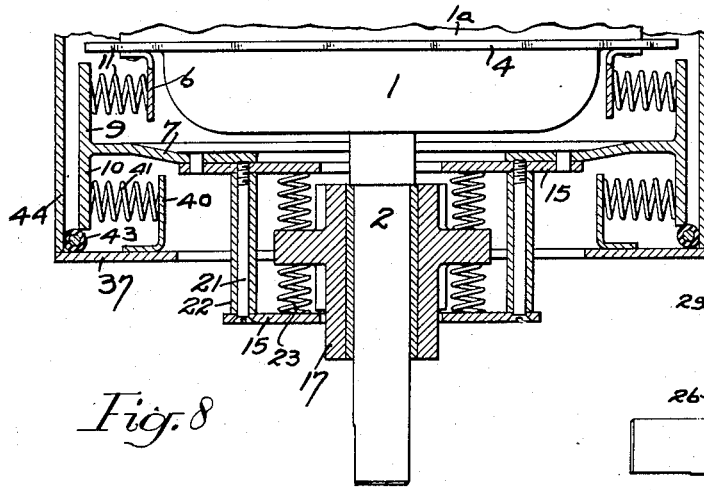
Figure 7:
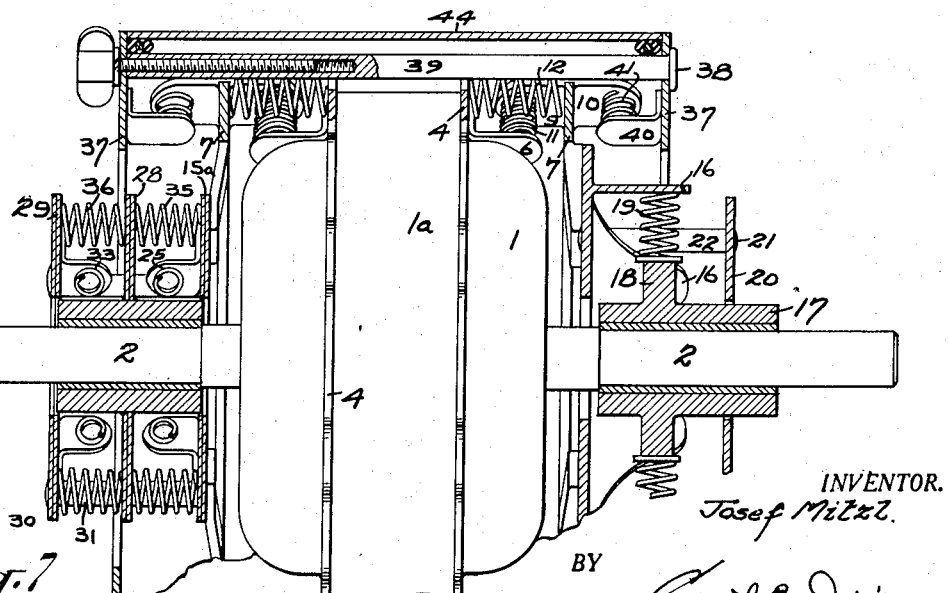

Figures 7 and 8 are sections on the lines 7—7 and 8—8 of Figure 3.

Figure 9:
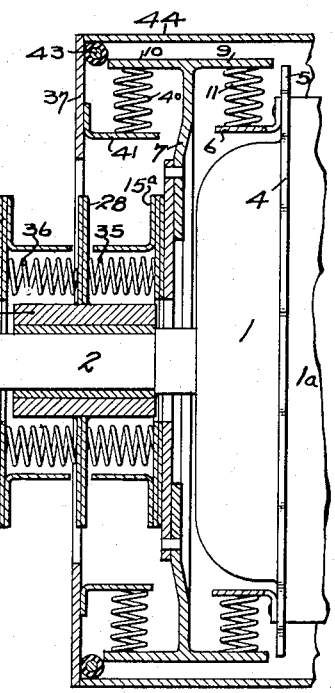

Figure 9 is a section on the line 9—9 of Figure 1, and

Figure 2:
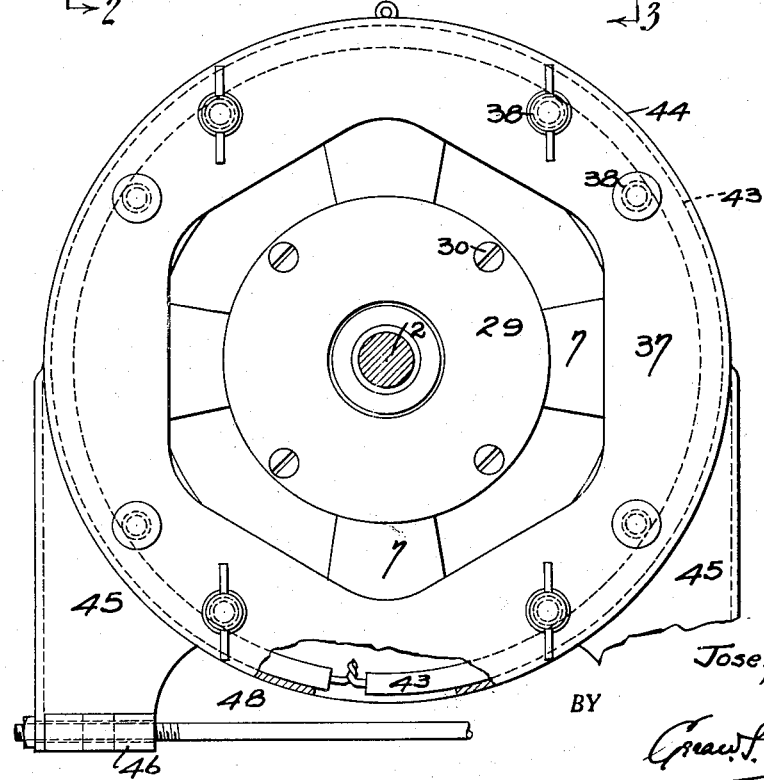
Figure 2 is an end view on the line 2—2 of Figure 1.
Figure 10:
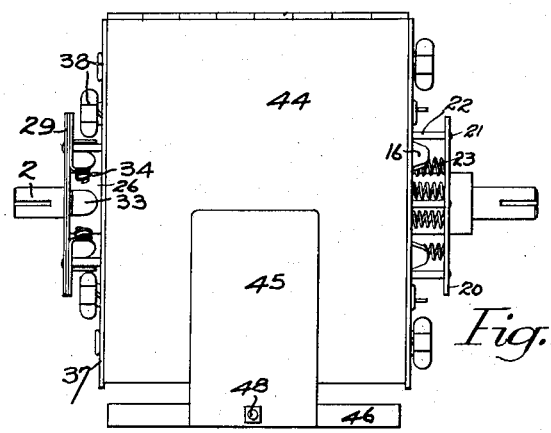

Figure 10 is a reduced side view of Figure 2.

Referring to the drawings, 1 designates the stationary frame of a conventional electric motor having its central portion 1a of greater diameter, and 2 is an ordinary armature shaft rotatable in said frame.

Secured against opposite sides of the central frame portion 1a as by screws 3, and of greater diameter than said central frame portion, are collars 4. The latter are provided with a plurality of spaced objections 5 which extend radially outwards, and also with a plurality of spaced lateral flanges 6.

7 denotes a pair of annular members which are spaced outwardly from the collars 4 and are concentrically arranged relative to the latter. These annular members are also spaced from the frame 1, and preferably are positioned outwardly of the latter. These members are held in parallel relationship by means of bolts 8. 9 and 10 denote a plurality of inwardly and outwardly disposed lateral flanges integral with said members which usually extend from the peripheries of the latter. The inward flanges 9 are positioned opposite the collar flanges 6 and between each pair of flanges 6 and 9 a compressed helical spring 11 is arranged; and again between the adjacent sides of the collar projections 5 and the members 7 are other compressed helical springs 12. In the peripheries of the annular members 7 a plurality of opposed slots or grooves 14 are formed for a purpose which will become apparent hereinafter.

An inner ring 15, or 15a, projects inwardly beyond each annular member 7 and is concentrically secured thereto.

Integral with the ring 15 is a laterally disposed multi-sided frame 16. A bearing 17 is mounted around one extremity of the shaft 2 and has a multi-sided flange 18 integral with it intermediately of its length. The sides of the flange 18 lie substantially parallel with the sides of the frame 16 and within the latter. Between the periphery of each side of the flange 18 and the opposed side of the frame 16 a compressed helical spring 19 is provided. Arranged concentrically around the bearing 17 outwardly of the flange 18 and spaced from the said bearing is an annular plate 20 held in spaced relation to the inner ring 15 as by bolts 21 around which spacers 22 arranged between said plate and ring. Between the flange 18 and plate 20 and with their extremities in contact with both are a plurality of compressed helical springs 23, and between the opposite side of the flange 18 and the ring 15 other compressed helical springs 24 are provided.

In the drawings the ring 15a is shown consisting of a plurality of plates which lie against one another and are generally made of spring steel. Secured to this ring are a plurality of angle members 25 the laterally projecting portions of which would all form tangents to a common circle described about the axis of the shaft 2. A bearing 26 is arranged around the adjacent extremity of the shaft 2, and 27 are compressed helical springs extending radially from the bearing 26 and having their opposite extremities supported by the laterally projecting portions of the angle members 25. A flange 28 consisting in the present instance of a plurality of resilient plates is secured around the periphery of the bearing 26 intermediately of its length. Arranged concentrically around the bearing 26 adjacent its outer extremity and spaced therefrom is an annular plate 29 which is held in spaced relationship to the inner ring 15a as by bolts 30 having annular spacers 31 around them which extend between said plate and ring. The flange 28 has a plurality of peripheral slots 32 formed in it to permit passage of and provide clearance around the spacers 31. On the inner side of the plate 29 a plurality of angle members 33 are secured which are preferably so arranged as to be opposite the angle members 25 and have their lateral portions substantially in alignment with the lateral portions of the members 25. Between the periphery of the bearing 26 and the lateral portions of the members 33 compressed helical springs 34 are provided.

Between the flange 28 and the ring 15a a concentrically arranged set of compressed helical springs 35 is provided which lie substantially parallel with the axis of the shaft 2, and between the said flange and the plate 29 is a second and similar set of compressed helical springs 36. Each spring 36 is preferably in alignment with one of the springs 35.

Two annular discs 37 are concentrically arranged outwardly from the member 7 and spaced therefrom. These discs are held substantially parallel to one another as by bolts 38 around which are annular spacers 39 that extend between the adjacent faces of said discs. The bolts 38 and spacers 39 pass through the slots or grooves 14 in the members 7 so that they do not contact the latter. Projecting laterally inward from each of the discs 37 are a plurality of elements 40 each of which lies nearer the shaft 2 than an opposed flange 10. Between each opposed pair of flanges 10 and elements 40 a compressed helical spring 41 extends, and between the faces of the discs 37 and the annular members 7 other compressed helical springs 42 are provided. Around the inner faces of the discs 37 adjacent their peripheries pieces of rubber or other resilient material are provided as indicated at 43. It will also be noted that the outer margins of the flanges 10 terminate a short distance from the inner sides of the discs 37 so that these parts do not come directly into contact with one another.

44 denotes a substantially circular casing consisting of two substantially semi-circular portions hingedly connected to one another. The outer margins of the casing are engaged and frictionally held by the inner sides of the discs 37 which are drawn together by tightening the bolts 38, and the inner face of the casing rests against the rubber pieces 43. Extending downwardly from the outer side of each casing portion is a stand 45 terminating in a base portion 46, and the two base portions are held in correct relation to one another by a bolt 48.

The stationary frame portion 1 has the collars 4 secured to it, and these collars are resiliently supported by the annular members 7 through the springs 11 and 12. The bearing is resiliently supported from the ring 15 secured to one of the members 7 by the springs 19, 23 and 24 and the annular plate 20. The bearing 26 is resiliently supported from the ring 15a secured to the other member 7 through springs 27, 34, 35 and 36 and the plate 29. The annular members 7 are resiliently supported by the discs 37 through the springs 41 and 42, and the casing 44 which is in contact with the annular discs 37 is held away from the members 7 by the pieces of resilient material 43. Thus while the stationary frame 1 and bearings 17 and 26 are relatively amply supported the possibility of vibration being transmitted to the former through the rotation of the shaft 2 is reduced, and again frame vibration is very largely absorbed by the springs 41 and 42.

While ordinarily I prefer to employ the bearing supporting arrangement shown in connection with the bearing 17, the arrangement shown for mounting the bearing 26 is sometimes found preferable when a motor is to be subjected to frequent starting and stopping under load as the resilient form of the ring 15a and flange 28 flexes to some slight extent with the springs by which that bearing is also held.

While in the foregoing the preferred embodiment of my invention has been described and shown, it is understood that the construction is susceptible to such alterations and modifications as fall within the scope of the appended claims.

What I claim as my invention and desire to secure by Letters Patent is:

1. In a supporting arrangement of the character described, the combination of a stationary frame, a rotatable shaft extending therethrough, spaced collars secured to said frame, annular members spaced from said frame, means holding said members in relatively spaced relation, springs extending between said collars and said annular members so that the weight of the frame and collars is supported by said members, bearings around said shaft extremities, means on said annular members for resiliently supporting said bearings, and a supporting base by which said members are resiliently carried.

2. In a supporting arrangement of the character described, the combination of a stationary frame, a rotatable shaft extending therethrough, spaced collars secured to said frame, annular members spaced from said frame, means holding said members in relatively spaced relation, springs extending radially from said collars to said members, other springs extending from said collars to said members substantially at right angles to said first named springs, bearings around said shaft extremities, resilient means supporting each bearing from one of said members, and a base by which said members are resiliently supported.

3. In a supporting arrangement of the character described, the combination of a stationary frame, a rotatable shaft extending therethrough, spaced collars secured to said frame which lie parallel to one another, annular members spaced from said frame and collars, means holding said members parallel with and spaced from one another, lateral projections on said collars, other lateral projections on said members, said collar projections being disposed opposite said member projections, springs extending between said collar and member projections, other springs extending between said collars and said members substantially at right angles to said first named springs, bearings mounted on the extremities of said shaft, separate resilient means supporting each bearing from one of said members, and a base by which said members are supported.

4. In a supporting arrangement of the character described, the combination of a stationary frame, a rotatable shaft extending therethrough, spaced collars secured to said frame which lie substantially parallel to one another, annular members spaced from said frame and collars and substantially parallel with the latter, means holding said members in spaced relation to one another, a plurality of springs extending from each collar to one of the members so that the weight of the frame and collars is transmitted through said springs to said members, inner rings on said members, bearings mounted on the extremities of said shaft, annular plates spaced from said inner rings and parallel thereto, means extending from said inner rings holding said plates in spaced relation to the former, annular flanges projecting from said bearings intermediately of their length, springs extending between said flanges and said inner rings, other springs extending between said flanges and said plates, springs supporting said bearings radially, flanges integral with said inner rings against which said latter springs bear, and a base by which said members are resiliently supported.

5. In a supporting arrangement of the character described, the combination of annular members, a frame around which said members are arranged, a shaft rotatable in said frame and extending therethrough, bearings on the extremities of said shaft, an annular flange intermediate the length of each bearing, springs extending both radially and parallel with the axis of the shaft from one of the flanges through which that flange and its bearing are supported by one of the members, resilient means supporting the other bearing from the other member, and means supporting said members.

6. In a supporting arrangement of the character described, the combination of a stationary frame, a rotatable shaft extending therethrough, collars mounted around said frame and secured thereto, said collars being substantially concentric with said shaft and parallel with one another, annular members spaced from said frame and collars and substantially concentric with said shaft, means holding said members in spaced relation to one another, springs extending radially from said collars to said members, other springs extending from said collars to said members and lying substantially parallel with the axis of said shaft, bearings around the extremities of said shaft, means resiliently supporting said bearings from said members, annular discs concentric with said shaft and spaced from one another, means holding said disc in spaced relation, resilient means supporting said members from said discs, a hinged casing consisting of two substantially semi-circular halves the sides of which are frictionally engaged by the adjacent sides of said discs, a base portion on each half of the casing, and means holding both base portions the desired distance apart.

JOSEF MITZL.